US012809868B2

(12) United States Patent
Huang et al.

(10) Patent No.: US 12,809,868 B2
(45) Date of Patent: Nov. 24, 2026

(54) DRAFT MODEL SELECTION FOR SPECULATIVE DECODING WITH MULTIPLE EXPERT MODELS

(71) Applicant: Huawei Technologies Co., Ltd., Shenzhen (CN)

(72) Inventors: Jerry Huang, Kanata (CA); Prasanna Parthasarathi, Kanata (CA); Mehdi Rezagholi Zadeh, Concord (CA); Boxing Chen, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/030,632

(22) Filed: Jan. 17, 2025

(65) Prior Publication Data

US 2025/0384043 A1 Dec. 18, 2025

Related U.S. Application Data

(60) Provisional application No. 63/661,361, filed on Jun. 18, 2024.

(51) Int. Cl.
*G06F 16/2455* (2019.01)

(52) U.S. Cl.
CPC ................................ *G06F 16/2455* (2019.01)

(58) Field of Classification Search
None
See application file for complete search history.

(56) References Cited

U.S. PATENT DOCUMENTS

| | | | | |
|---|---|---|---|---|
| 2024/0320433 | A1* | 9/2024 | Lott | G06F 40/284 |
| 2024/0338611 | A1* | 10/2024 | Shafran | G06N 20/20 |
| 2025/0117626 | A1* | 4/2025 | Ramanujan | G06N 3/08 |
| 2025/0124256 | A1* | 4/2025 | Agarwal | G06N 3/044 |
| 2025/0225374 | A1* | 7/2025 | Goel | G06N 3/096 |
| 2025/0299026 | A1* | 9/2025 | Imanigooghari | G06F 40/30 |
| 2025/0363353 | A1* | 11/2025 | Zhong | G06N 3/08 |
| 2025/0371317 | A1* | 12/2025 | Thompson, III | G06N 3/006 |

OTHER PUBLICATIONS

Cai, Tianle et al., "Medusa: Simple LLM Inference Acceleration Framework with Multiple Decoding Heads," arXiv:2401.10774v3, Jun. 14, 2024, 27 pages.

Chen, Charlie et al., "Accelerating Large Language Model Decoding with Speculative Sampling," arXiv:2302.01318v1, Feb. 2, 2023, 11 pages.

(Continued)

*Primary Examiner* — Richard L Bowen

(74) *Attorney, Agent, or Firm* — Slater Matsil, LLP

(57) ABSTRACT

A method for generating output using multiple large language models (LLMs) including at least one expert model and a plurality of draft models is disclosed. A selection policy that is configured to select, for each of the at least one expert model, a draft model that is maximally aligned with the expert model is trained. The policy is trained using a training dataset comprising inputs from multiple contexts. Upon receiving a first user input, a pair of expert and draft models for processing the first user input using the trained policy is determined. The output is generated using the determined pair of models.

17 Claims, 6 Drawing Sheets

(56) References Cited

OTHER PUBLICATIONS

Dettmers, Tim et al., "LLM.int8(): 8-bit Matrix Multiplication for Transformers at Scale," arXiv:2208.07339v2, Nov. 10, 2022, 20 pages.
Liu, Fangcheng et al., "Kangaroo: Lossless Self-Speculative Decoding via Double Early Exiting," arXiv:2404.18911v1, Apr. 29, 2024, 11 pages.
Gu, Jiatao et al., "Non-Autoregressive Neural Machine Translation," arXiv:1711.02281v2, Mar. 9, 2018, 13 pages.
Hooper, Coleman et al., "SPEED: Speculative Pipelined Execution for Efficient Decoding," arXiv:2310.12072v2, Jan. 3, 2024, 11 pages.
Kim, Sehoon et al., "Speculative Decoding with Big Little Decoder," arXiv:2302.07863v4, Oct. 12, 2023, 21 pages.
Leviathan, Yaniv et al., "Fast Inference from Transformers via Speculative Decoding," arXiv:2211.17192v2, May 18, 2023, 13 pages.
Li, Yuhui et al., "Eagle: Speculative Sampling Requires Rethinking Feature Uncertainty," arXiv:2401.15077v3, Mar. 4, 2025, 13 pages.
Stern, Mitchell et al., "Blockwise Parallel Decoding for Deep Autoregressive Models," arXiv:1811.03115v1, Nov. 7, 2018, 10 pages.
Varshney, Neeraj et al., "Accelerating LLAMA Inference by Enabling Intermediate Layer Decoding via Instruction Tuning with LITE," arXiv:2310.18581v2, Nov. 7, 2023, 20 pages.
Voita, Elena et al., "Analyzing Multi-Head Self-Attention: Specialized Heads Do the Heavy Lifting, the Rest Can Be Pruned," arXiv:1905.09418v2, Jun. 7, 2019, 12 pages.
Wu, Zhanghao et al., "Lite Transformer with Long-Short Range Attention," arXiv:2004. 11886v1, Apr. 24, 2020, 13 pages.
Liu, Xiaoxuan et al., "Online Speculative Decoding," arXiv:2310. 07177v4, Jun. 10, 2024, 16 pages.
Yang, Seongjun et al., "Predictive Pipelined Decoding: A Compute-Latency Trade-off for Exact LLM Decoding," arXiv:2307.05908v2, Jul. 29, 2024, 19 pages.
Zhang, Jun et al., "Draft & Verify: Lossless Large Language Model Acceleration via Self-Speculative Decoding," arXiv:2309.08168v2, May 20, 2024, 19 pages.

* cited by examiner

DRAFT MODEL SELECTION FOR SPECULATIVE DECODING WITH MULTIPLE EXPERT MODELS

CROSS-REFERENCE TO RELATED APPLICATION

The present application claims the benefit of U.S. Provisional Patent Application No. 63/661,361 filed on Jun. 18, 2024, the contents of which are incorporated herein by reference.

BACKGROUND

Despite their widespread adoption, large language models (LLMs) remain prohibitive to use in resource-constrained settings, with their ever-growing sizes only increasing the barrier for use. Maximizing the inference speed of LLMs can be achieved in various ways, such as by modifying the model architecture, quantization, pruning, and the like. However, the use of auto-regressive generation within LLMs remains a bottleneck, and while certain modified generation procedures exist, these methods are often task-dependent, which limits their overall applicability.

Speculative decoding is a performance optimization technique used in natural language processing (NLP) and machine learning, particularly when generating sequences, like text, with LLMs. It combines two language models to accelerate the generation process: a smaller, faster model ("draft model") and a larger, more accurate model ("expert model"). The expert model is typically a large, state-of-the-art language model, such as GPT-4 and LLAMA. A draft model predicts multiple candidate tokens or sequences (e.g., via greedy or beam search) and acts as a guide, making informed guesses about what the expert model is likely to generate next. The expert model then verifies the candidate tokens/sequences proposed by the draft model. If the candidates align with what the expert model would have generated, they are accepted; otherwise, the expert model may regenerate from scratch. By delegating some of the workload to the faster draft model, a system employing speculative decoding may avoid running the slower, computationally intensive expert model as frequently, thereby speeding up text generation while preserving the quality of the output.

In the decoding process, "context" refers to information or state used by a model to make decisions during sequence generation. Context serves as the foundation for both the draft and expert models to generate and verify tokens. The context may comprise input context (i.e., input prompt or sequence provided to the model) or generated context (e.g., tokens or text already generated during decoding). The draft model uses the current context to propose candidate tokens or sequences for the next step. Context guides the draft model to make plausible predictions that align with the broader meaning and flow of the text. The expert model uses the same context to evaluate the draft model's proposals. The expert model ensures that the accepted proposals align with what the expert model would generate based on the given context. Any mismatch or drift in the context between the draft and expert models can lead to errors, such as inconsistencies in the generated text or rejected speculative proposals.

Speculative decoding is not without its own challenges. The draft model should generate candidates that are consistent with the expert model's understanding of the context. If the draft model strays from the context, its proposals will likely be rejected. Moreover, large contexts, such as long prompts or sequences, can be computationally expensive to manage, especially if both models must repeatedly process the same context. As new tokens are generated, the context evolves. This requires efficient mechanisms are required to keep both models updated with the latest context.

SUMMARY

The present application proposes techniques that facilitate increasing the inference speed of text generation from LLMs. A policy, which may be represented by a neural network, is trained to estimate the benefit (or reward) of using a specific draft model with a given expert, or expert, model on some user input. This can be done by first collecting sample user inputs and learning how different draft model outputs align with those of the expert model. The user inputs are used to build a dataset of rewards, which can be used to train the decision-making policy in a cost-effective and readily adaptable manner.

According to one aspect of this disclosure, there is provided a method for generating output using multiple large language models (LLMs) including at least one expert model and a plurality of draft models. The method includes training a policy that is configured to select, for each of the at least one expert model, a draft model that is maximally aligned with the expert model, the policy being trained using a training dataset comprising inputs from multiple contexts. Upon receiving a user input, a pair of expert and draft models for processing the user input is determined using the trained policy. The final output is generated using the determined pair of models.

In some implementations, training the policy may include collecting an offline training dataset comprising sample user inputs. For each element in the training dataset, outputs from the at least one expert and draft models are generated. The similarity of the outputs of each draft model to the outputs of the at least one expert model is determined, and the output similarity data is added to the training dataset.

In some implementations, the similarity may be determined using a similarity metric to compute similarity scores for each candidate output of draft models.

In some implementations, the output similarity data may indicate a user input, a draft model, and the similarity score.

In some implementations, the similarity metric may be determined based on an inference speed associated with the draft model.

In some implementations the method may further include, for a new draft model, obtaining outputs from the new draft model and adding the new outputs to the offline training dataset.

According to another aspect of the present disclosure, there is provided a computer readable storage medium, comprising one or more instructions, wherein when the one or more instructions are run on a computer, the computer performs any of the methods disclosed herein.

According to another aspect of the present disclosure, there is provided a non-transitory computer-readable medium storing instruction the instructions causing a processor in a device to implement any of the methods disclosed herein.

According to another aspect of the present disclosure, there is provided a device configured to perform any of the methods disclosed herein.

According to another aspect of the present disclosure, there is provided a processor, configured to execute instructions to cause a device to perform any of the methods disclosed herein.

According to another aspect of the present disclosure, there is provided an integrated circuit configure to perform any of the methods disclosed herein.

According to another aspect of the present disclosure, there is provided a module comprising: one or more circuits for performing any of the methods disclosed herein.

According to another aspect of the present disclosure, there is provided an apparatus comprising: one or more processors functionally connected to one or more memories for performing any of the methods disclosed herein.

According to another aspect of the present disclosure, there is provided an apparatus configured to perform any of the methods disclosed herein.

In some embodiments, the apparatus comprises one or more units configured to perform the above-described method.

According to another aspect of the present disclosure, there is provided one or more non-transitory, computer-readable storage media comprising computer-executable instructions, wherein the instructions, when executed, cause at least one processing unit, at least one processor, or at least one circuits to perform any of the methods disclosed herein.

According to another aspect of the present disclosure, there is provided one or more computer-readable storage media storing a computer program, wherein, when the computer program is executed by an apparatus, the apparatus is enabled to implement any of the methods disclosed herein.

According to another aspect of the present disclosure, there is provided a computer program product including one or more instructions, wherein, when the instructions are executed by an apparatus, the apparatus is enabled to implement any of the methods disclosed herein.

According to another aspect of the present disclosure, there is provided a computer program, wherein, when the computer program is executed by a computer, an apparatus is enabled to implement any of the methods disclosed herein.

According to another aspect of the present disclosure, there is provided a system comprising a node for performing any of the methods disclosed herein.

BRIEF DESCRIPTION OF THE DRAWINGS

Embodiments are described in detail below, with reference to the following drawings.

Like reference numerals are used in the drawings to denote like elements and features.

DETAILED DESCRIPTION OF EMBODIMENTS

Figure 1:
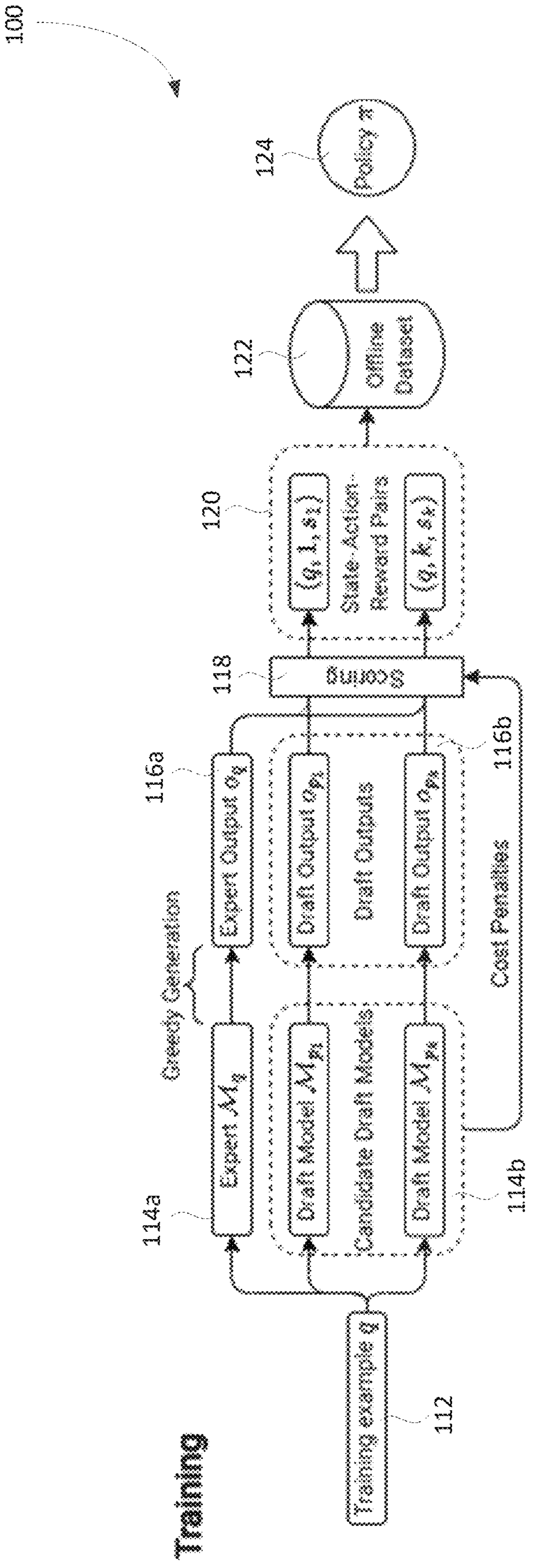
FIG. 1 illustrates a process flow for training a policy using offline data collected from a given expert model and a plurality of draft models.

Embodiments disclosed herein relate to systems and apparatuses using large language models (LLMs). The systems and apparatuses disclosed herein may comprise suitable modules and/or circuitries for executing various procedures.

As those skilled in the art understand, a "module" is a term of explanation referring to a hardware structure such as a circuitry implemented using technologies such as electrical and/or optical technologies (and with more specific examples of semiconductors) for performing defined operations or processing. A "module" may alternatively refer to the combination of a hardware structure and a software structure, wherein the hardware structure may be implemented using technologies such as electrical and/or optical technologies (and with more specific examples of semiconductors) in a general manner for performing defined operations or processing according to the software structure in the form of a set of instructions stored in one or more non-transitory, computer-readable storage devices or media.

A module may be a part of a device, an apparatus, a system, and/or the like, wherein the module may be coupled to or integrated with other parts of the device, apparatus, or system such that the combination thereof forms the device, apparatus, or system. Alternatively, the module may be implemented as a standalone device or apparatus.

The module usually executes a procedure for performing a method. Herein, a procedure has a general meaning equivalent to that of a method. More specifically, a procedure is a defined method implemented using hardware components for processing data. A procedure may comprise or use one or more functions for processing data as designed. Herein, a function is a defined sub-procedure or sub-method for computing, calculating, or otherwise processing input data in a defined manner and generating or otherwise producing output data.

As those skilled in the art will appreciate, a procedure may be implemented as one or more software and/or firmware programs having necessary computer-executable code or instructions and stored in one or more non-transitory computer-readable storage devices or media which may be any volatile and/or non-volatile, non-removable or removable storage devices such as RAM, ROM, EEPROM, solid-state memory devices, hard disks, CDs, DVDs, flash memory devices, and/or the like. A module may read the computer-executable code from the storage devices and execute the computer-executable code to perform the procedure.

Alternatively, a procedure may be implemented as one or more hardware structures having necessary electrical and/or optical components, circuits, logic gates, integrated circuit (IC) chips, and/or the like.

Independent Draft Model Selection for Speculative Decoding

LLMs are neural network models that learn the semantics and syntax of language by encoding (sub) words into vector representations. LLMs are often trained for text generation. The most capable LLMs contain billions of trainable parameters and are based on the decoder-only Transformer architecture. The training corpus typically includes trillions of words compiled from various sources such as the web. LLMs can be adapted for specific tasks, either through fine-tuning or prompt-engineering. Prompt-engineering does not require any additional model parameter updates.

Within this space, various techniques can be used to render LLMs nearly as capable as humans. However, the use of resource intensive models and techniques remains a pre-requisite and accordingly, methods have been developed and applied to alleviate concerns relating to the practical usability of these models. One major area that has observed improvement over time is the auto-regressive decoding aspect of text generation. The generation process involves predicting tokens sequentially, one at a time, in a left-to-right (or sometimes other directional) order. At each step, the model generates one token based on all previously generated tokens and the initial input context (or prompt). Each predicted token is fed back into the model as input for the next step, making the process recursive. At every step, the model outputs a probability distribution over the vocabulary, indicating the likelihood of each token being the next. A decoding strategy, such as greedy search, beam search, and the like, selects a token from this distribution.

Since predictions for each token depend on the preceding ones, the generation process is inherently sequential and computationally slow for long outputs. Furthermore, unlike non-sequential generation methods, auto-regressive decoding cannot take advantage of parallel processing because tokens must be generated step-by-step. In particular, the sequential generation of tokens often under-utilizes the capabilities of modern accelerators (e.g. GPUS, TPUs) to parallelize computations.

A popular approach for addressing latency issues of LLMs is speculative decoding. Speculative decoding is a technique designed to accelerate inference processes of LLMs by utilizing a smaller, more efficient language model ("draft model") to predict the outputs of a larger expert model. The draft model generates multiple tokens, which the expert model then verifies in parallel. More specifically, given a large expert model, $M_e$, which is reliable but incurs large end-to-end latencies, speculative decoding aims to solve the latency issue by using a suitable draft model. The draft model must be similar to the expert model; otherwise, the expert continually corrects the drafts and negates any potential benefits of speedups.

Thus, while individual draft models can assist with generation, they are only reliable when their knowledge distribution within a domain match that of the expert. Accordingly, using only one draft model may not serve well in general purpose settings. However, by dynamically choosing between multiple draft models in any given scenario, inference speedup of LLMs may be attained. In particular, when presented with a query q, selecting a draft model among multiple unique candidates can lead to varying performance, depending on the selected draft option.

Low predictive accuracy of a draft model, when faced with diverse text inputs and a significant capability gap between the draft and expert models, can limit the efficacy and practical applicability of speculative decoding. When user inputs fall outside the scope of expertise of a draft model, even if the expert model is able to process the inputs without issue, deploying assisted decoding can be problematic. Online speculative decoding is a method that is aimed at addressing these issues. The (multiple) draft model(s) are updated on observed user query data, for example, using excess computational power in an LLM serving cluster. That is, surplus computational power in an LLM serving cluster can be repurposed for online training of draft models. By retraining on query distribution, the draft models can continuously evolve with new queries and are better able to accurately predict the expert model's outputs, particularly on data originating from query distributions.

Figure 3:
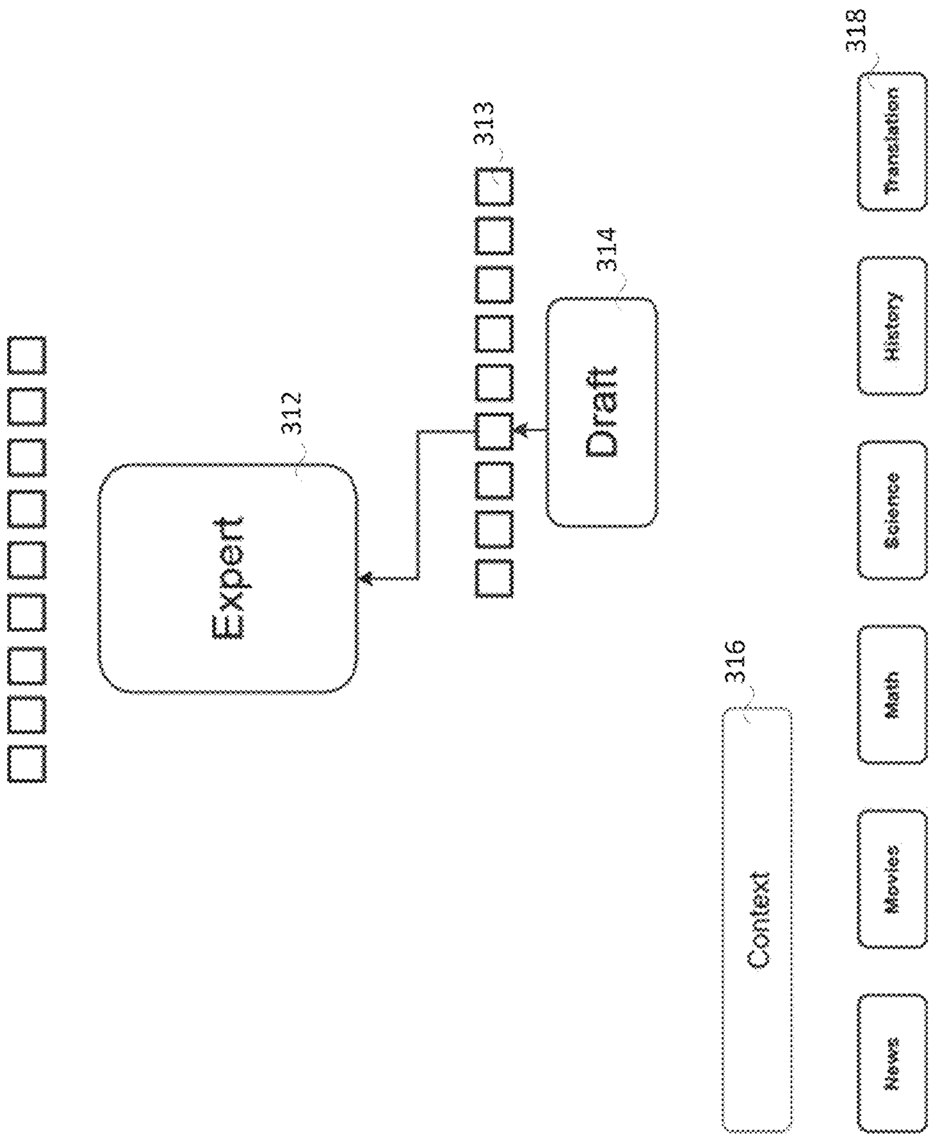
FIG. 3 is a schematic diagram of a one-to-one draft and expert model approach for speculative decoding.

Reference is made to FIG. 3 which is a schematic diagram of a one-to-one draft and expert model approach for speculative decoding. The draft model 314 generates multiple tokens 313, based on text input (and more generally, a given context 316 relating to one or more domains 318), with their respective probability distributions. The expert model 312 performs verification of the generated tokens, correcting discrepancies to ensure that the outputs remain consistent with those produced without the draft model 314. If the draft model 314 proposes incorrect tokens, both the draft and expert distributions may be stored in a buffer. Once the buffer exceeds a size limit or is too old, the draft model may be updated by calculating the loss between the draft and expert distributions using various distance metrics.

A major disadvantage of the online speculative decoding method is that it does not scale efficiently with multiple experts, as training the draft models is meant to adapt online with the expert models. The one-to-one draft and expert model approach selects a draft-expert model pair a priori and attempts to improve decoding through faster inference. However, the assumption that the pair must be static does not hold for scenarios in which generation (e.g., text generation) is expected to perform well over diverse domains/topics. For example, the expert model may be desired to be swapped with another, and/or the draft model may be required to align with the expert model. Insufficient signals to determine which draft model to pick contingent on a given task affects the quality as well as the time taken to generate text. The one-to-one draft and expert model approach does not contemplate or facilitate draft model selection and use of multiple expert models.

The present application proposes a solution for accelerating text generation that is meant to be model agnostic and general. More particularly, the proposed solution includes techniques for choosing between multiple available drafting models for speculative decoding. The proposed draft model selection technique accommodates use of multiple draft models within a single generation pipeline. This is especially beneficial in cases of an expert model that is a multi-task expert, but where draft models themselves may only have a subset of the expertise. Furthermore, the proposed technique supports introducing new expert models at linear cost, as it is only required to prompt any new expert with existing examples and conducting further offline training.

Figure 4:
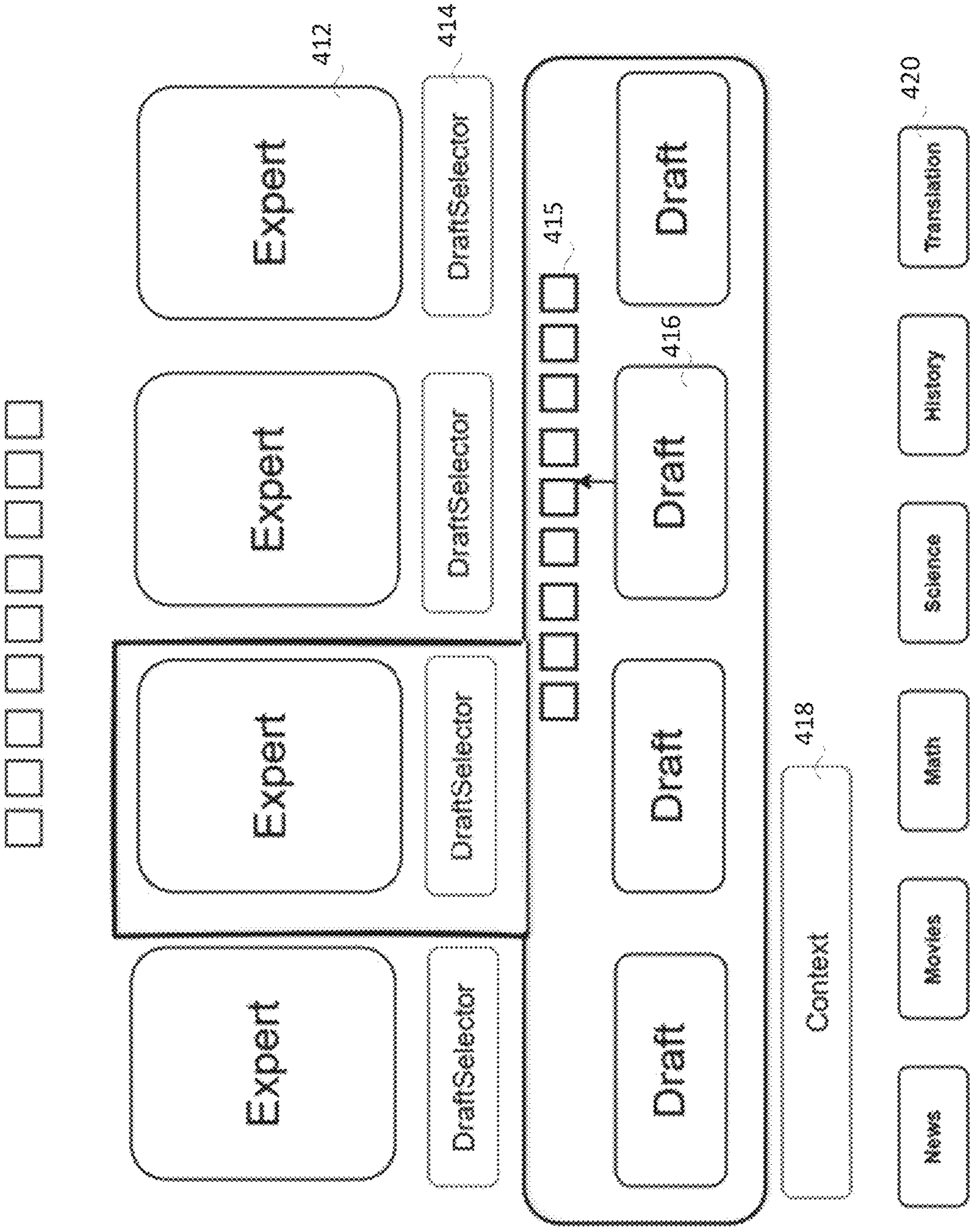
FIG. 4 is a schematic diagram of a many-to-many draft and expert model approach for speculative decoding.

FIG. 4 illustrates a many-to-many draft and expert model approach for speculative decoding, in accordance with embodiments of the present application. As shown in FIG. 4, each expert model 412 is associated with a respective "draft selector" 414. For each expert model 412, a draft selection policy is trained for identifying a draft model that maximizes alignment between the draft model and the expert model 412. The draft selector 414 is configured to implement the trained policy, by selecting one of a plurality of different draft models 416 to use with the expert model 412 for some input (i.e., a given context 418, relating to one or more domains 420).

Conceptually, an offline reward collection process is used to estimate the contextual alignment between different draft models and an expert model on a set of training examples. With this offline reward dataset, a policy is trained for a decision-making process by formulating the problem within a "contextual bandits" setting. That is, a speculative decoding scenario is framed as a "contextual bandits" problem, where multiple draft models serve as "arms" that each produce a reward, an abstraction of the inference speedup relative to using the expert model on its own (which is not known a priori). Using the trained policy for draft selection may lead to speedups in generation while also balancing trade-offs in draft model alignment and generation speed by incorporating explicit information about the model within the rewards.

From a "contextual bandits" perspective, query q represents a context for which there are k arms that each returns an independent reward r. Each arm corresponds to a different draft model whose reward is the time it takes to generate the output sequence through speculative decoding. Accordingly, each arm can produce a different reward for each q. The objective then consists of learning a policy $\pi(\cdot|q)$ which, for any given context q, can select among the arms which can produce the greatest reward. From a speculative decoding scenario, the goal is to select the draft model whose abilities best align with the expert for a given query, as this will minimize the number of times the expert model must be invoked.

Randomly choosing a draft model may result in significant increases in latency, therefore learning to make the correct decision in a sample efficient manner is important. While the ideal reward is the real/observed speedup, this can be expensive if the alignment with draft models is unknown. As such, a cheaper proxy may be necessary. However, two factors have a direct effect on the true reward: 1) the alignment between expert and draft model, and 2) the size of the draft model. This provides an alternative way to collect policy training data: use the draft models auto-regressively and compute alignment scores with the expert outputs, then adjust these based on the size of the draft model.

Reference is made to FIG. 1 which illustrates a process flow 100 for training a decision making policy, in accordance with example embodiments. Given an expert model 114*a*, $M_e$, and a plurality of draft models 114*b*, $$\{M_{p_j}\}_{j=1}^{k},$$

the goal is to train a policy 124, $\pi_\theta$, that can determine which draft model 114*b* to use with the expert model 114*a* for some input query q'. The policy 124 is a function which may be represented as a neural network, such as a multi-layer perceptron. To train the policy 124, offline examples are first collected from a training dataset comprising a set of example queries 112, $$Q = \{q_i\}_{i=1}^{n}.$$

For each element $q_i$ in the training dataset, outputs are generated from each model individually, producing a batch of expert outputs 116*a*, $o_e$, from the expert model 114*a* and draft outputs 116*b*, $$\{o_{p_i}\}_{i=1}^{k},$$

from the candidate draft models 114*b*. In some implementations, the expert model 114*a* and each candidate draft model 114*b* are used in an isolated fashion to generate a greedily decoded output from each model, which are used to construct a reward dataset.

The draft outputs 116*b* are scored by a scoring component 118. In at least some implementations, a similarity metric can be used to compute a score for each draft output 116*b*:

$$s_i = f(o_e, o_{p_i}).$$

In particular, the score may be the value of a similarity function $f$ with arguments $o_e$ and $o_{pj}$. The score represents a measure of the alignment between the expert model 114*a* and candidate draft models 114*b* for $q_i$. The similarity scores are computed for the outputs of each expert/draft model pair. The policy is trained to identify a draft model that is maximally aligned with the expert model 114*a* based on the similarity scores. In particular, a candidate draft model 114*b* corresponding to a draft output having the highest similarity score may be selected as the draft model for use with the expert model 114*a*.

It is further possible to incorporate a score for the inference speed. For example, if some relative measure of the inference speed is represented, for a specific draft model, as $c_i$, then one can adjust the similarity score as a weighted sum, $$s_i = \alpha \cdot f(o_e, o_{p_i}) + (1 - \alpha) \cdot c_i$$

which takes into account both the alignment and cost, where $\alpha$ is a hyper-parameter representing trade-off between output alignment and cost.

In some implementations, a simple function may be used for generating fixed costs for the different candidate draft models. More particularly, given that the candidates have $P=\{p_1, p_2, \ldots p_k\}$ parameters, the cost for the models may be modeled by $$c_i = 1 - \frac{e^{p_i}}{e^{p_j}}$$

$$\text{where } j = \underset{i}{\operatorname{argmax}}\, p_i$$

Although larger draft models may be better aligned with the expert model compared to smaller options, using them incurs a latency that can end up being less efficient. Observed decoding speed varies as a function of draft model size and alignment with the expert. A dynamic policy adapts to the preferences set by the choice of $\alpha$. For example, as $\alpha$ approaches 1, the policy 124 places increasing preference on the smallest draft model regardless of quality. On the other hand, $\alpha \rightarrow 0$ shows increasing preference towards the model that has greatest alignment with the expert generations.

The outputs are then added to an offline dataset 122 of state-action-reward tuples 120, $$(q_i, j, s_i^j),$$

where the state is the example query, the action is the draft model from which the output was decoded, and the reward is the score computed for the draft model. This dataset is used to train $\pi_\theta$ using reinforcement learning. In particular, with the offline dataset, it becomes possible to train a policy $\pi_\theta$ that can independently act on a context by choosing a draft model to use with the expert.

Within the "contextual bandits" formulation, the query corresponds to an episode $q \in Q$ of length 1 (meaning that it consists of a single state and action) and the action $a_t \in A(q_t)$ is the draft model which produced an observed reward $r(q_t, a_t)$ (i.e., the similarity score). The policy is represented by a mapping $\pi_\theta(a|q)$ from Q×A to $\mathbb{R}$, and it is desired to find policy parameters $\theta^*$ that maximize the objective $$J^{\pi} = \mathbb{E}_{q\sim P_q(\cdot),\, a\sim\pi(\cdot|q)}[r(q, a)]$$

where $P_q$ is the sampling distribution of the context. As the action space is discrete, $$\int_a \pi_\theta(a \mid q)\, da = \sum_{a\in A(q)} \pi_\theta(a \mid q) = 1$$

and the gradient with respect to the policy parameters is $$\nabla_\theta J^{\pi_\theta} = \mathop{\mathbb{E}}_{q\sim P_q(\cdot),\, a\sim\pi_\theta(\cdot \mid q)}\left[\nabla \log_{\pi_\theta}(a \mid q) r(q, a)\right]$$

Accordingly, policy gradients can be directly used to train the policy where the offline examples consist of independent episodes of length 1.

Figure 2:
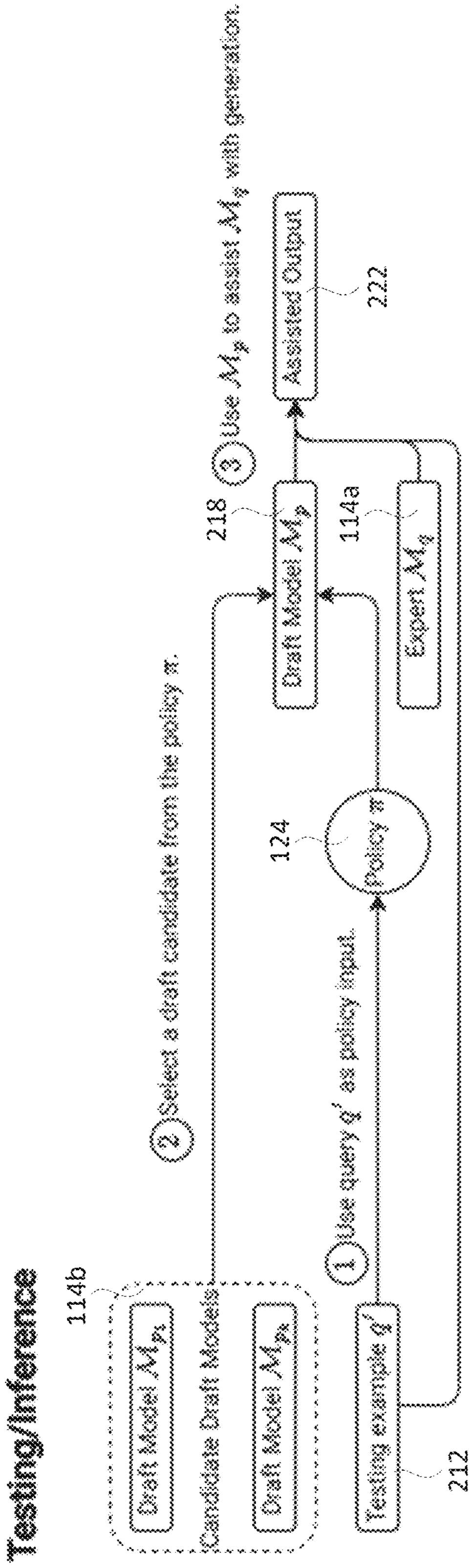
FIG. 2 illustrates a process flow for using the trained policy of FIG. 1 to select, for a given input query, a draft model to use for assisted generation with an expert model.

As illustrated in FIG. 2, at inference time, a query 212, q', can be passed as input to the policy 124 in order to get a distribution over the candidate draft models 114*b*. More particularly, a distribution modeling the similarity of expert outputs 116*a* and draft outputs 116*b* conditioned on the query q' is determined, using the policy 124. The selected candidate draft model 218 can be directly used with the expert model 114*a* to generate an assisted output 222. In at least some implementations, the input to the trained policy $\pi_\theta$ may be a sentence embedding of the query q'. The output of the policy is a distribution over the candidate draft models 114*b*, from which a draft model 218 is sampled and used to assist decoding for the specific query.

An advantageous aspect of the proposed approach of the present disclosure is the ability to arbitrarily add new draft models to the generation pipeline without the need to re-train components of the pipeline outside of the policy. In particular, given a new draft model $M_{p_{k+1}}$, it is only needed to generate outputs from this new draft model and add new examples to the offline dataset.

Though $\pi_\theta$ is required to be trained to incorporate the new candidate draft model, the policy is designed to be small and cheap to optimize relative to the LLMs involved for generation. Hence, such a method is easily scalable and requires little to no adaptation of the generation pipeline.

Another important feature is the ability to add new experts to the pipeline. Similar to the draft models, it is only needed to generate outputs from the experts to build new state-action-reward pairs that can be used for training. Additionally, regardless of whether to use a unified policy for all experts or an individual policy for each expert, the method remains computationally scalable given the size of the policy being minimal.

As a specific example, consider a translation system that is based on a large expert LLM. Inference from the model may be accurate but slow due to its size. For each pair of languages that the LLM can handle, a candidate draft model may be provided to facilitate accelerating the translation. If the translation system is requested to support translation to a new language L, the expert LLM can be adapted offline to add this new capability and new draft models can be further introduced to accommodate translation to and from L. Given a database of prompts requesting translations to or from L, the expert and all existing candidate draft models can be prompted to generate sample outputs. These outputs can all be compared and scored, and used to train a new policy offline. Once this policy is trained, the expert model, draft models, and the new policy can be quickly deployed in tandem as an update to the translation system.

As another example, suppose a household consists of N individuals. At some point in time, a new individual may join. Given that this new individual may have different preferences from the existing individuals of the household, a new expert model may be tuned and added to the system. Due to differences in preferences, the existing draft models may need to be used differently for the new expert. For example, individual 1 may prefer to use draft model 1 for movie recommendations and draft model 2 for summarization, while the new individual may want to use draft model 1 for summarization and 2 for recommendations. As such, the collected data can be used on the new individual's preferences and the same policy training pipeline may be applied to learn a new policy for the new individual. This requires no training of draft models or the expert; instead, it only requires adapting a new policy to the newly introduced individual/expert.

Figure 5A:
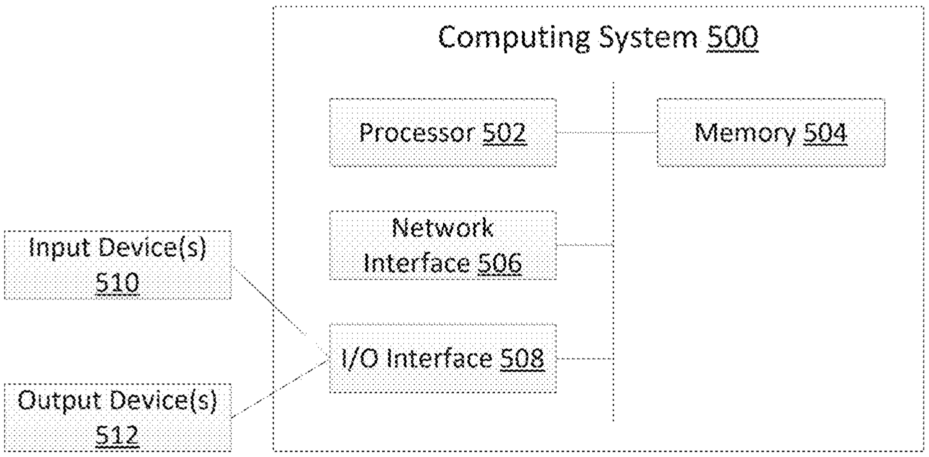
FIG. 5A illustrates an example computing system, in accordance with example embodiments.

FIG. 5A illustrates an example computing system 500, which may be used to implement examples of the present disclosure, such as a generative AI system that employs a trained policy to select models for use in generating outputs through speculative decoding. Additionally, or alternatively, one or more instances of the example computing system 500 may be employed to execute the LLM. For example, a plurality of instances of the example computing system 500 may cooperate to provide output using an LLM in manners as discussed above.

The example computing system 500 includes at least one processing unit, such as a processor 502, and at least one physical memory 504. The processor 502 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 504 may include a volatile or non-volatile memory (e.g., a flash memory, a random-access memory (RAM), and/or a read-only memory (ROM)). The memory 504 may store instructions for execution by the processor 502, to the computing system 500 to carry out examples of the methods, functionalities, systems and modules disclosed herein.

The computing system 500 may also include at least one network interface 506 for wired and/or wireless communications with an external system and/or network (e.g., an intranet, the Internet, a P2P network, a WAN and/or a LAN). A network interface may enable the computing system 500 to carry out communications (e.g., wireless communications) with systems external to the computing system 500, such as a language model residing on a remote system.

The computing system 500 may optionally include at least one input/output (I/O) interface 508, which may interface with optional input device(s) 510 and/or optional output device(s) 512. Input device(s) 510 may include, for example, buttons, a microphone, a touchscreen, a keyboard, etc. Output device(s) 512 may include, for example, a display, a speaker, etc. In this example, optional input device(s) 510 and optional output device(s) 512 are shown external to the computing system 500. In other examples, one or more of the input devices 510 and/or output device(s) 512 may be an internal component of the computing system 500.

Figure 5B:
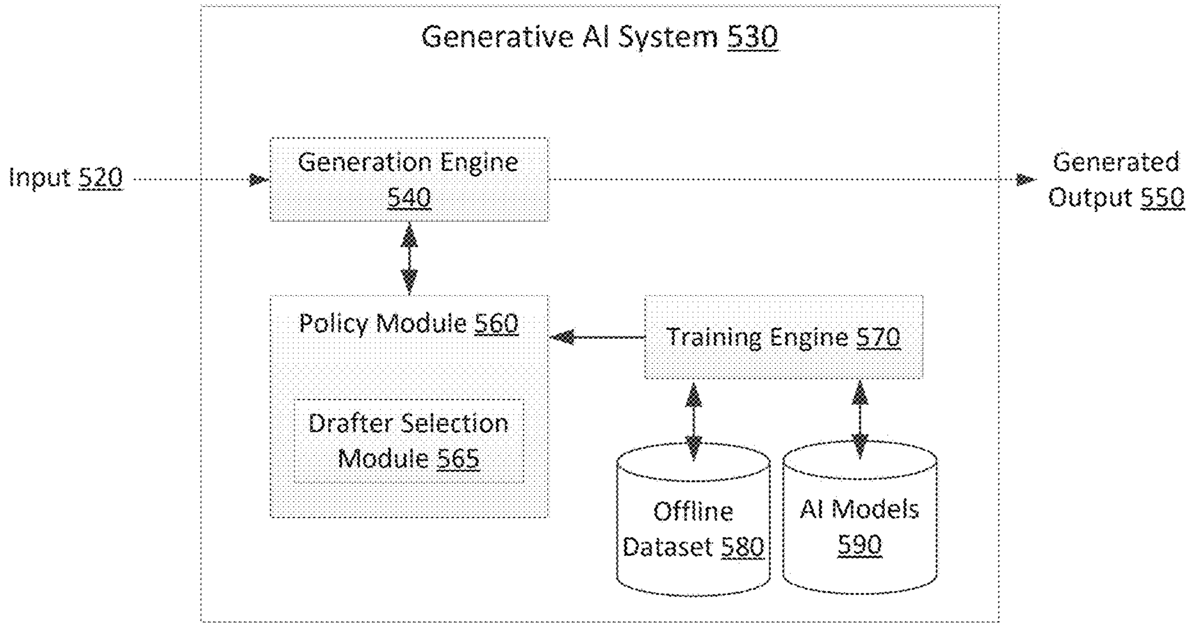
FIG. 5B illustrates a generative AI system that incorporates speculative decoding techniques for accelerating model inference.

Reference is made to FIG. 5B, which illustrates an example generative artificial intelligence (AI) system 530. The generative AI system 530 is configured to generate sequences (e.g., text) with large language models. The components of the generative AI system 530 may collectively implement various optimization techniques for speculative decoding, in accordance with the presently disclosed embodiments. The generative AI system 530 includes a generation engine 540, a policy module 560, and a training engine 570. The generation engine 540 processes input 520, such as input prompts, provided by a user and generates output(s) 550 based on the input 520. The generation engine 540 is communicably coupled to the policy module 560. The policy module 560 may include, or implement, a drafter selection module 565. The drafter selection module 565 is configured to select, for each expert model, a draft model that is to be used in conjunction with the expert model in speculative decoding processes. In particular, the drafter selection module 565 may implement the techniques described herein for selecting a draft model from multiple different candidate draft models.

The training engine 570 is configured to train, for each of one or more expert models, a policy that can determine which draft model to use with the expert model for some input. The training engine 570 accesses AI models 590 and an offline training dataset 580, and uses the offline data to produce outputs from the expert model and multiple candidate draft models. The outputs are compared to determine how similar or closely aligned each draft output is with the expert output. The trained policies associated with various expert models are communicated to the policy module 560.

Figure 6:
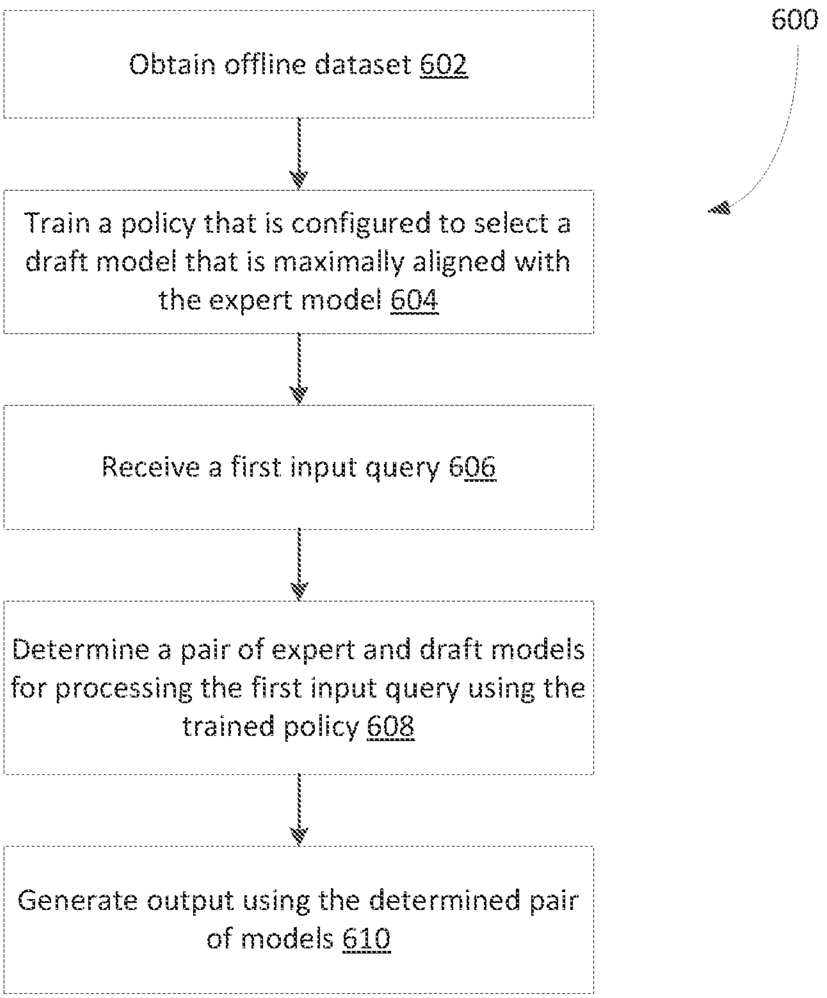
FIG. 6 shows, in flowchart form, an example method for training and deploying a policy for selecting a draft model for speculative decoding with an expert model.

Reference is made to FIG. 6 which shows, in flowchart form, an example method 600 for training and deploying a policy for selecting a draft model for speculative decoding with an expert model. More particularly, the method 600 may be implemented to accelerate decoding during sequence (e.g., text) generation using multiple large language models (LLMs). The operations of method 600 may be performed by a generative AI system, such as the system 530 of FIG. 5B.

In operation 602, the system obtains an offline dataset comprising example queries. Given the set of queries, the system produces outputs based on each example query for the expert model and a plurality of candidate draft models. A similarity metric may be used to compute scores for each candidate output to measure alignment between expert and candidate drafts for each example query. The outputs are then added to the offline dataset. In particular, the outputs may be expressed as state-action-reward tuples, where the state is the example query, the action is the draft model from which the output was decoded, and the reward is the score computed for the draft model.

In operation 604, a policy is trained on the offline dataset using reinforcement learning techniques. Reinforcement learning is a type of machine learning where an agent (e.g., a decision-maker) learns to make decisions by interacting with an environment. The agent's goal is to maximize a cumulative reward over time by taking a series of actions. At each time step of interaction, the agent observes the current state and chooses an action based on its policy. The environment responds with a new state and a reward, and the agent updates its knowledge or policy based on the feedback. The agent improves its policy to maximize cumulative rewards, for example, using algorithms like Q-learning or policy gradient methods. As described in greater detail above, for an expert model, a policy is trained using offline data collected from outputs of the candidate draft models, which are scored to produce reward samples. In the speculative decoding scenario, the state is the input, the action is the draft model from which the output was decoded, and the reward is the similarity score computed.

The trained policy can then be deployed for model inference tasks. When a first input query is received from a user (operation 606), the system determines a pair of expert and draft models for processing the first input query using the trained policy, in operation 608. More specifically, the first input query is passed through the trained policy to get a distribution modeling the similarity of expert outputs and draft outputs conditioned on the first input query. The system can select a draft model from the multiple candidate draft models and directly use the selected draft model to generate with the expert model (operation 610). That is, the expert-draft model pair is used to generate an output based on the first input query, using speculative decoding methods.

Herein, use of language such as "at least one of X, Y, and Z," "at least one of X, Y, or Z," "at least one or more of X, Y, and Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

In some implementations, the methods disclosed herein may be implemented as computer-executable instructions stored in one or more non-transitory computer-readable storage devices (in the form of software, firmware, or a combination thereof) such that, the instructions, when executed, may cause one or more physical components such as one or more circuits to perform the methods disclosed herein.

For example, in some implementations, an apparatus comprising one or more processors functionally connected to one or more non-transitory computer-readable storage devices or media may be used to perform the methods disclosed herein, wherein the one or more non-transitory computer-readable storage devices or media store the computer-executable instructions of the methods disclosed herein, and the one or more processors may read the computer-executable instructions from the one or more non-transitory computer-readable storage devices or media, and executes the instructions to perform the methods disclosed herein.

In some implementations, an apparatus may not have any processors or computer-readable storage devices or media. Rather, the apparatus may comprise any other suitable physical or virtual components for implementing the methods disclosed herein.

In some implementations, the computer-executable instructions that implement the methods disclosed herein may be one or more computer programs, one or more program products, or a combination thereof.

In some implementations, the methods disclosed herein may be implemented as one or more circuits, one or more components, one or more units, one or more modules, one or more integrated-circuit (IC) chips, one or more chipsets, one or more devices, one or more apparatuses, one or more systems, and/or the like.

The one or more circuits, one or more components, one or more units, one or more modules, one or more IC chips, one or more chipsets, one or more devices, one or more apparatuses, or one or more systems may be physical, virtual, or a combination thereof. Herein, the term "virtual" (such as a "virtual apparatus") refers to a circuit, component, unit, module, chipset, device, apparatus, system, or the like that is simulated or emulated or otherwise formed using suitable software or firmware such that it appears as if it is "real" or physical).

The present disclosure encompasses various embodiments, including not only method embodiments, but also other embodiments such as apparatus embodiments and embodiments related to non-transitory computer readable storage media. Embodiments may incorporate, individually or in combinations, the features disclosed herein.

Although this disclosure refers to illustrative embodiments, this is not intended to be construed in a limiting sense. Various modifications and combinations of the illustrative embodiments, as well as other embodiments of the disclosure, will be apparent to persons skilled in the art upon reference to the description.

Features disclosed herein in the context of any particular embodiments may also or instead be implemented in other embodiments. Method embodiments, for example, may also or instead be implemented in apparatus, system, and/or computer program product embodiments. In addition, although embodiments are described primarily in the context of methods and apparatus, other implementations are also contemplated, as instructions stored on one or more non-transitory computer-readable media, for example. Such media could store programming or instructions to perform any of various methods consistent with the present disclosure.

Those skilled in the art will appreciate that the above-described embodiments and/or features thereof may be customized, separated, and/or combined as needed or desired. Moreover, although embodiments have been described above with reference to the accompanying drawings, those of skill in the art will appreciate that variations and modifications may be made without departing from the scope thereof as defined by the appended claims.

The invention claimed is:

1. A method for generating outputs using multiple large language models (LLMs), the multiple LLMs including at least one expert model and a plurality of draft models, wherein the method comprises:

obtaining an offline training dataset comprising user queries from a plurality of contexts;

for each query in the offline training dataset:

generating, based on the query, outputs from the at least one expert model and each of the plurality of draft models;

determining similarity of an output of each draft model to an output of the at least one expert model;

adding output similarity data to the offline training dataset;

training a policy, using the offline training dataset, to select, for each of the at least one expert model, a draft model that is maximally aligned with the expert model;

receiving input of a first user query;

determining a first expert model and a first draft model for processing the first user query using the trained policy; and generating an output based on the first user query using the first expert model and the first draft model, wherein generating the output comprises configuring the first draft model to assist decoding for the first user query using speculative decoding with the first expert model.

2. The method of claim 1, wherein the similarity of an output of a draft model to the output of the at least one expert model is represented by a similarity score that is computed using a similarity metric.

3. The method of claim 2, wherein the output similarity data includes:

an indication of a query from the offline training dataset;

an identifier of the draft model; and the similarity score computed for the draft model.

4. The method of claim 2, wherein the similarity score is computed based on an inference speed associated with the draft model.

5. The method of claim 4, wherein the similarity score is computed as a weighted sum of a value of the similarity metric and the inference speed associated with the draft model.

6. The method of claim 1, further comprising, for a new draft model:

obtaining, for each query in the offline training dataset, an output from the new draft model; and adding the outputs from the new draft model to the offline training dataset.

7. The method of claim 1, wherein determining the first expert model and the first draft model for processing the first user query comprises obtaining, via the trained policy, a distribution over the plurality of draft models and selecting a first one of the draft models based on the distribution.

8. The method of claim 1, wherein the policy comprises a neural network.

9. A computing system for generating outputs using multiple large language models (LLMs), the multiple LLMs including at least one expert model and a plurality of draft models, wherein the computing system comprises:

a processor; and a memory coupled to the processor, the memory storing computer-executable instructions that, when executed by the processor, configure the processor to:

obtain an offline training dataset comprising user queries from a plurality of contexts;

for each query in the offline training dataset:

generate, based on the query, outputs from the at least one expert model and each of the plurality of draft models;

determine similarity of an output of each draft model to an output of the at least one expert model;

add output similarity data to the offline training dataset;

train a policy, using the offline training dataset, to select, for each of the at least one expert model, a draft model that is maximally aligned with the expert model;

receive input of a first user query;

determine a first expert model and a first draft models for processing the first user query using the trained policy; and generate an output based on the first user query using the first expert model and the first draft model, wherein generating the output comprises configuring the first draft model to assist decoding for the first user query using speculative decoding with the first expert model.

10. The computing system of claim 9, wherein the similarity of an output of a draft model to the output of the at least one expert model is represented by a similarity score that is computed using a similarity metric.

11. The computing system of claim 10, wherein the output similarity data includes:

an indication of a query from the offline training dataset;
an identifier of the draft model; and
the similarity score computed for the draft model.

12. The computing system of claim 10, wherein the similarity score is computed based on an inference speed associated with the draft model.

13. The computing system of claim 12, wherein the similarity score is computed as a weighted sum of a value of the similarity metric and the inference speed associated with the draft model.

14. The computing system of claim 9, wherein the computer-executable instructions, when executed, further configure the processor to, for a new draft model:
obtain, for each query in the offline training dataset, an output from the new draft model; and
add the outputs from the new draft model to the offline training dataset.

15. The computing system of claim 9, wherein determining the first expert model and the first draft model for processing the first user query comprises obtaining, via the trained policy, a distribution over the plurality of draft models and selecting a first one of the draft models based on the distribution.

16. The computing system of claim 9, wherein the policy comprises a neural network.

17. A non-transitory, computer-readable medium storing instructions for generating outputs using multiple large language models (LLMs), the multiple LLMs including at least one expert model and a plurality of draft models, wherein the instructions, when executed by a processor, configure the processor to:
obtain an offline training dataset comprising user queries from a plurality of contexts;
for each query in the offline training dataset:
generate, based on the query, outputs from the at least one expert model and each of the plurality of draft models;
determine similarity of an output of each draft model to an output of the at least one expert model;
add output similarity data to the offline training dataset;
train a policy, using the offline training dataset, to select, for each of the at least one expert model, a draft model that is maximally aligned with the expert model;
receive input of a first user query;
determine a first expert model and a first draft models for processing the first user query using the trained policy; and
generate an output based on the first user query using the first expert model and the first draft model, wherein generating the output comprises configuring the first draft model to assist decoding for the first user query using speculative decoding with the first expert model.

* * * * *